United States Patent
Lee et al.

(10) Patent No.: US 11,621,418 B2
(45) Date of Patent: Apr. 4, 2023

(54) LITHIUM COMPLEX OXIDE

(71) Applicant: ECOPRO BM CO., LTD., Cheongju-si (KR)

(72) Inventors: Jung Han Lee, Cheongju-si (KR); Seung Woo Choi, Cheongju-si (KR); Moon Ho Choi, Cheongju-si (KR); Jun Won Suh, Cheongju-si (KR); Jin Kyeong Yun, Cheongju-si (KR); Mi Hye Yun, Cheongju-si (KR); Kwang Seok Choi, Cheongju-si (KR); Joong Ho Bae, Cheongju-si (KR); Jin Oh Son, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 203 days.

(21) Appl. No.: 17/085,519

(22) Filed: Oct. 30, 2020

(65) Prior Publication Data
US 2021/0135216 A1     May 6, 2021

(30) Foreign Application Priority Data
Oct. 31, 2019     (KR) .................. 10-2019-0137539

(51) Int. Cl.
*H01B 1/08*     (2006.01)
*H01M 4/525*     (2010.01)
(Continued)

(52) U.S. Cl.
CPC ............ *H01M 4/525* (2013.01); *C01G 53/50* (2013.01); *H01B 1/08* (2013.01); *H01M 4/364* (2013.01);
(Continued)

(58) Field of Classification Search
CPC ........ H01B 1/08; H01M 4/364; H01M 4/525; G01G 53/50
See application file for complete search history.

(56) References Cited

U.S. PATENT DOCUMENTS

| 10,991,938 B2 * | 4/2021 | Lee .................. C01G 53/50 |
| 2018/0026268 A1 * | 1/2018 | Kim .................. H01M 4/485 |
| | | 429/223 |

(Continued)

FOREIGN PATENT DOCUMENTS

EP     3816112 A1 *     5/2021

OTHER PUBLICATIONS

Sigma-Aldrich product sheet (sigma-aldrich.com) Silicon powder 215619 (pub version Mar. 14, 2018).*

*Primary Examiner* — Mark Kopec
(74) *Attorney, Agent, or Firm* — Saliwanchik, Lloyd & Eisenschenk

(57) ABSTRACT

A lithium complex oxide includes a mixture of first particles of n1 (n1>40) aggregated primary particles and second particles of n2 (n2≤20) aggregated primary particles, the lithium complex oxide represented by Chemical Formula 1 and having FWHM (deg., 2θ) of 104 peak in XRD, defined by a hexagonal lattice having R-3m space group, in a range of Formula 1:

$$Li_aNi_xCo_yMn_zM_{1-x-y-z}O_2,$$ [Chemical Formula 1]

where M is selected from: B, Ba, Ce, Cr, F, Mg, Al, Cr, V, Ti, Fe, Zr, Zn, Si, Y, Nb, Ga, Sn, Mo, W, P, Sr, and any combination thereof, 0.9≤a≤1.3, 0.6≤x≤1.0, 0.0≤y≤=0.4, 0.0≤z≤0.4, and 0.0≤1−x−y−z≤0.4, $$-0.025 \leq FWHM_{(104)} - \{0.04 + (x_{first\ particle} - 0.6) \times 0.25\} \leq 0.025,$$ [Formula 1]

(Continued)

where $\text{FWHM}_{(104)}$ is represented by Formula 2, $$\text{FWHM}_{(104)} = \{(\text{FWHM}_{\text{Chemical Formula 1 powder}(104)} - 0.1 \times \text{mass ratio of second particles})/\text{mass ratio of first particles}\} - \text{FWHM}_{\text{Si powder}(220)}. \quad \text{[Formula 2]}$$

15 Claims, 13 Drawing Sheets

(51) Int. Cl.

| | | |
|---|---|---|
| *C01G 53/00* | (2006.01) | |
| *H01M 4/36* | (2006.01) | |
| *H01M 4/505* | (2010.01) | |
| *H01M 10/0525* | (2010.01) | |
| *H01M 4/02* | (2006.01) | |

(52) U.S. Cl.
CPC ....... *H01M 4/505* (2013.01); *H01M 10/0525* (2013.01); *C01P 2002/52* (2013.01); *C01P 2002/72* (2013.01); *C01P 2002/76* (2013.01); *C01P 2004/03* (2013.01); *C01P 2004/50* (2013.01); *C01P 2004/53* (2013.01); *C01P 2004/61* (2013.01); *C01P 2004/62* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2019/0020024 A1* | 1/2019 | Wang | C01G 53/50 |
| 2019/0334163 A1* | 10/2019 | Lee | H01M 4/505 |
| 2021/0036321 A1* | 2/2021 | Donoue | H01M 4/364 |
| 2021/0111396 A1* | 4/2021 | Choi | H01M 4/131 |

* cited by examiner

LITHIUM COMPLEX OXIDE

CROSS-REFERENCE TO RELATED APPLICATION

This application claims priority to Korean Patent Application No. 10-2019-0137539, filed on Oct. 31, 2019, which is hereby incorporated by reference in its entirety.

TECHNICAL FIELD

Embodiments of the present disclosure relate to a mixture of lithium complex oxides, and more particularly, to a lithium complex oxide showing effects of improving life characteristics of a battery including the lithium complex oxide by adjusting a range of a full width at half maximum (FWHM) value of a 104 peak of XRD, defined by a hexagonal lattice having an R-3m space group, when first particles and second particles having different numbers of aggregated primary particles are mixed, to maintain a predetermined relationship with a mole fraction of nickel in the lithium complex oxide and a mass ratio between the first particles and the second particles.

DISCUSSION OF RELATED ART

In order to meet the trend toward miniaturization and high performance of various devices, high energy density in addition to miniaturization and weight reduction of lithium batteries is becoming important. In other words, high voltage and high capacity lithium batteries are becoming more important.

Complex metal oxides such as $LiCoO_2$, $LiMn_2O_4$, $LiNiO_2$, and $LiMnO_2$ which are examples of lithium complex oxides used as positive electrode active materials for lithium batteries are being studied. Among the lithium complex oxides, $LiCoO_2$ is most widely used because of its excellent life characteristics and charging/discharging efficiency, but it has a disadvantage in that its structural stability is low and its price competitiveness is limited because it is expensive due to resource limitations of cobalt which is used as raw material.

Lithium manganese oxides such as $LiMnO_2$ and $LiMn_2O_4$ have advantages in that they are excellent in thermal stability and inexpensive but have problems in that their capacity is small and high-temperature characteristics are poor.

In addition, the $LiNiO_2$-based positive electrode active material exhibits battery characteristics of high discharge capacity but is quite difficult to synthesize due to a problem of cation mixing between Li and a transition metal, and accordingly, there is a large problem in rate characteristics.

In order to compensate for these shortcomings, the demand for a nickel (Ni)-rich system having a Ni content of 60% or more as a positive electrode active material for secondary batteries has begun to increase. However, although the active material of such a Ni-rich system has an excellent advantage of providing high capacity, there are problems in that as the Ni content increases, structural instability increases due to Li/Ni cation mixing, and life characteristics at room temperature and high temperature are rapidly degraded due to physical disconnection of internal particles arising from micro-cracks, aggravation of electrolyte depletion, and the like.

SUMMARY

It is known that occurrence of micro-cracks, which are known as the cause of degradation of life characteristics of a Ni-rich positive electrode active material, is correlated with a size of primary particles of a positive electrode active material. Specifically, it is known that as the size of the primary particles is reduced, crack generation due to repeated shrinkage/expansion of the particles may be suppressed more. However, when the size of the primary particles is reduced, there is a problem that discharge capacity is reduced, and when the content of nickel in the positive electrode active material increases, the life characteristics may be degraded when the size of the primary particles is reduced. Accordingly, in order to improve the life characteristics of the Ni-rich positive electrode active material, the correlation between the nickel content, the size of the primary particles, and the discharge capacity should be considered.

Aspects of embodiments of the present disclosure are directed to a lithium complex oxide improved in terms of life characteristics and capacity characteristics by adjusting a full width at half maximum (FWHM) in XRD measurement to be within a predetermined range so that the FWHM may keep a predetermined relationship with a mole fraction of nickel in an active material and a mass ratio between first particles and second particles.

According to an embodiment of the present disclosure, a lithium complex oxide includes a mixture of first particles in which n1 (n1>40) number of primary particles are aggregated and second particles in which n2 (n2≤20) number of primary particles are aggregated, the lithium complex oxide is represented by the following Chemical Formula 1, and the lithium complex oxide has a full width at half maximum (FWHM) (deg., 2θ) of a 104 peak in an XRD peak, defined by a hexagonal lattice having an R-3m space group, in a range of the following Relational Formula 1:

$$Li_aNi_xCo_yMn_zM_{1-x-y-z}O_2,$$ [Chemical Formula 1]

where in Chemical Formula 1, M is at least one selected from the group consisting of: B, Ba, Ce, Cr, F, Mg, Al, Cr, V, Ti, Fe, Zr, Zn, Si, Y, Nb, Ga, Sn, Mo, W, P, Sr, and a combination thereof, 0.9≤a≤1.3, 0.6≤x≤1.0, 0.0≤y≤0.4, 0.0≤z≤0.4, and 0.0≤1−x−y−z≤0.4, $$-0.025 \leq FWHM_{(104)} - \{0.04 + (x_{first\ particle} - 0.6) \times 0.25\} \leq 0.025,$$ [Relational Formula 1]

where $FWHM_{(104)}$ in Relational Formula 1 is represented by the following Relational Formula 2, $$FWHM_{(104)} = \{(FWHM_{Chemical\ Formula\ 1\ powder(104)} - 0.1 \times mass\ ratio\ of\ second\ particles)/mass\ ratio\ of\ first\ particles\} - FWHM_{Si\ powder(220)},$$ [Relational Formula 2]

where in Relational Formula 2, $FWHM_{Chemical\ Formula\ 1\ powder\ (104)}$ is a FWHM of a 104 peak observed near 44.5° (2θ) in an XRD measurement value of the lithium complex oxide, $FWHM_{Si\ powder\ (220)}$ is a FWHM of a 220 peak observed near 47.3° (2θ) in an XRD measurement value of a Si powder, $x_{first\ particle} = (x - x_{second\ particle} \ast mass\ ratio\ of\ second\ particles)/mass\ ratio\ of\ first\ particles, $x_{second\ particle}$ meaning a Ni molar rate of the second particles, and the mass ratios mean a mass rate with respect to the total mass of the first particles and the second particles.

Provided that particles having more than n1 number of primary particles that can be distinguished by the naked eye through SEM analysis are referred to as 'multi-particles', and particles having n2 number of primary particles or less are referred to as 'single particles', the lithium complex oxide according to an embodiment of the present disclosure has a single-particle-mixed bimodal structure in which large particles in the form of multi-particle and small particles in the form of single particle are mixed.

When a positive electrode active material in such a single-particle-mixed bimodal structure is applied to a secondary battery, BET is reduced, gas generation is suppressed, and storage characteristics are improved, as compared to the case of applying a multi-particle-mixed bimodal positive electrode active material in which large particles in the form of multi-particle and small particles in the form of multi-particle are mixed.

In some embodiments, the second particles of the lithium complex oxide according to an embodiment of the present disclosure may each have 20 or less, or 15 or less, or 10 or less, or 5 or less primary particles.

In some embodiments, in the lithium complex oxide according to an embodiment of the present disclosure, the range of the FWHM of the 104 peak in the XRD analysis as illustrated in the above Relational Formula 1 may have a predetermined relationship with the content of nickel in the first particles ($x_{first\ particle}$) and the mass ratio between the first particles and the first particles.

In some embodiments, in the above Relational Formula 1, an optimum FWHM range of the lithium complex oxide according to an embodiment of the present disclosure may be in a range of −0.25 to 0.25 or −0.20 to 0.20. When the lithium complex oxide having a single-particle-mixed bimodal structure in the optimum FWHM range is applied to a secondary battery, storage characteristics and life characteristics of the battery are excellent.

In some embodiments, in the lithium complex oxide according to an embodiment of the present disclosure, the FWHM value in the XRD analysis may be corrected by using the FWHM of the Si powder as a reference sample, as in the above Relational Formula 2, since there are deviations and errors due to various variables such as the condition of analysis equipment, X-ray source, and measurement conditions.

In some embodiments, in the lithium complex oxide according to an embodiment of the present disclosure, an average particle diameter of the first particles may be in a range of 8 to 20 µm, 9 to 18 µm, 10 to 15 µm, or 10 to 13 µm.

In some embodiments, in the lithium complex oxide according to an embodiment of the present disclosure, an average particle diameter of the second particles is in a range of 0.1 to 7 µm, 2 to 5 µm, or 3 to 4 µm.

In some embodiments, a crystal structure of the lithium complex oxide may be a hexagonal $\alpha$-NaFeO$_2$ (R-3m space group).

In some embodiments, in the lithium complex oxide according to an embodiment of the present disclosure, when a nickel content x in the above Chemical Formula 1 is in a range of 0.97 to 0.99, the range of the FWHM$_{(104)}$ represented by the above Relational Formula 2 satisfies 0.108° (2θ) to 0.162° (2θ).

In some embodiments, in the lithium complex oxide according to an embodiment of the present disclosure, when a nickel content x in the above Chemical Formula 1 is in a range of 0.93 to 0.95, the range of FWHM$_{(104)}$ represented by the above Relational Formula 2 satisfies 0.098° (2θ) to 0.152° (2θ).

In some embodiments, in the lithium complex oxide according to an embodiment of the present disclosure, when a nickel content x in the above Chemical Formula 1 is in a range of 0.87 to 0.89, the range of the FWHM$_{(104)}$ represented by the above Relational Formula 2 satisfies 0.083° (2θ) to 0.137° (2θ).

In some embodiments, in the lithium complex oxide according to an embodiment of the present disclosure, when a nickel content x in the above Chemical Formula 1 is in a range of 0.79 to 0.81, the range of the FWHM$_{(104)}$ represented by the above Relational Formula 2 satisfies 0.063° (2θ) to 0.117° (2θ).

Although not specifically described in the present disclosure, various peaks such as a 003 peak and a 101 peak, in addition to the 104 peak, are observed in the XRD analysis of the lithium complex oxide according to an embodiment of the present disclosure, and each peak has a different FWHM value. In the XRD analysis of the lithium complex oxide according to an embodiment of the present disclosure, peaks detected at positions other than the 104 peak may also have different FWHM ranges which maintain a predetermined relationship with the mole fraction of nickel and the mass ratio between the first particles and the second particles.

According to another embodiment of the present disclosure, a method for preparing the lithium complex oxide includes: preparing a first positive electrode active material by synthesizing a first positive electrode active material precursor including first particles in which n1 (n1>40) number of primary particles are aggregated and then firing the first positive electrode active material precursor after adding a lithium compound to the first positive electrode active material precursor; synthesizing a second positive electrode active material precursor including second particles in which n2 (n2≤20) number of primary particles are aggregated and then firing the second positive electrode active material precursor after adding a lithium compound to the second positive electrode active material precursor; preparing a second positive electrode active material by pulverizing a material formed in the synthesizing and the firing of the second positive electrode active material precursor; mixing the first positive electrode active material and the second positive electrode active material; and coating or doping the mixed material with a material M and then heat-treating the coated or doped material.

In some embodiments, in the adding of the lithium compound to the first positive electrode active material precursor and in the adding of the lithium compound to the second positive electrode active material precursor, the added lithium compound may be LiOH.

In some embodiments, an average particle diameter of the first positive electrode active material prepared in the preparing of the first positive electrode active material may be in a range of 8 to 20 µm, 9 to 18 µm, 10 to 15 µm, or 10 to 13 µm.

In some embodiments, an average particle diameter of the second positive electrode active material prepared in the preparing of the second positive electrode active material may be in a range of 0.1 to 7 µm, 2 to 5 µm, or 3 to 4 µm.

In some embodiments, the method may further include washing, after firing of the first positive electrode active material precursor, after firing of the second positive electrode active material precursor, or after pulverizing of the material.

In some embodiments, the method may further include washing, after heat-treating of the coated or doped material.

In some embodiments, in the coating or doping of the mixed material with the material M, the material M may be at least one selected from the group consisting of: B, Ba, Ce, Cr, F, Mg, Al, Cr, V, Ti, Fe, Zr, Zn, Si, Y, Nb, Ga, Sn, Mo, W, P, Sr, and a combination thereof, but embodiments are not limited thereto.

BRIEF DESCRIPTION OF THE DRAWINGS

A more complete appreciation of the present invention will become more apparent by describing in detail embodiments thereof with reference to the accompanying drawings, wherein.

DETAILED DESCRIPTION

Hereinafter, the present disclosure will be described in more detail with embodiments. However, the present disclosure is not limited by the following embodiments.

Measurement Method and Definition of Terms

In XRD measurement, a Cu-K$\alpha$1 radiation source was used as an X-ray source, and the measurement was performed at 0.02° step intervals in a range of 10 to 70° (2$\theta$) by a $\theta$-2$\theta$ scan (Bragg-Brentano parafocusing geometry) method.

Measurement of $FWHM_{(104)}$ and $FWHM_{(220)}$ for a Si powder was calculated by fitting of Gaussian function, and the fitting of Gaussian function for the FWHM measurement may be performed by using various academic/public/commercial softwares known to those skilled in the art.

A Si powder (product No. 215619) manufactured by Sigma-Aldrich was used as the Si powder.

Figure 2:
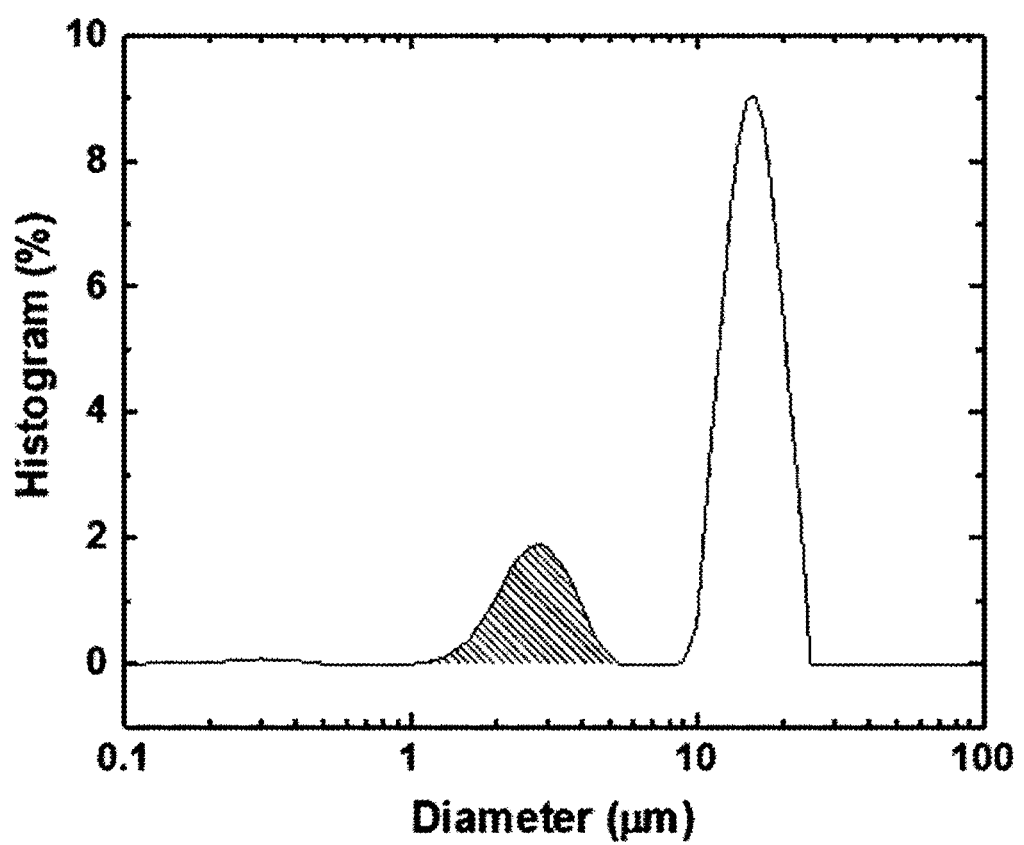
FIGS. 2 and 3 illustrate results of grain size analysis in terms of a mass mixing ratio between large particles and small particles of a lithium complex oxide according to an embodiment of the present disclosure.
Figure 3:
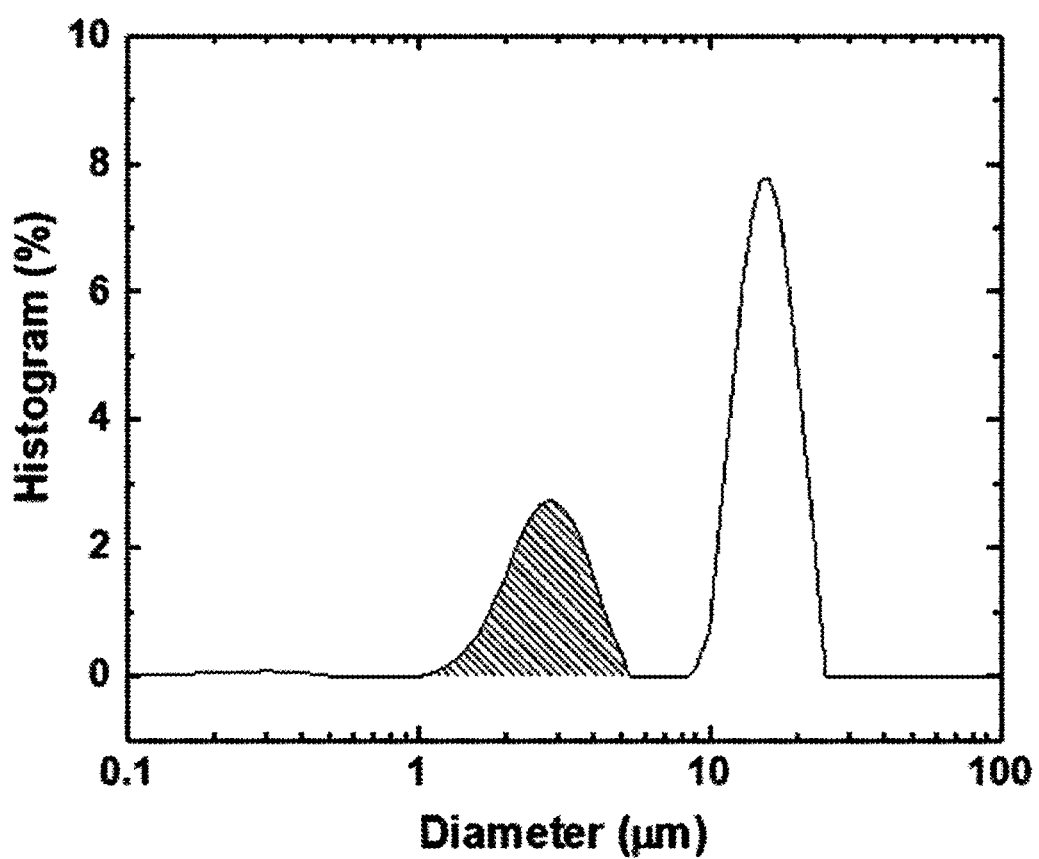

A mass mixing ratio between large particles and small particles was identified through grain size analysis, as illustrated in FIGS. 2 and 3.

The term 'FWHM range value' refers to a value of "$FWHM_{(104)}-\{0.04+(x-0.6)\times0.25\}$", and the term 'FWHM optimal range' refers to a case where the FWHM value is in a range of −0.025 to 0.025.

The term '$FWHM_{Large-particle(104)}$' refers to a $FWHM_{(104)}$ value of large particles, the term '$FWHM_{Small-particle(104)}$' refers to a $FWHM_{(104)}$ value of small particles, and the term '$FWHM_{Mixture(104)}$' refers to a $FWHM_{(104)}$ value of a lithium complex oxide prepared by mixing large particles and small particles.

Preparation Example 1

A positive electrode active material in which a mole fraction of Ni of multi-particulate large particles (e.g., large particles in the form of multi-particle) was 0.80 and a positive electrode active material in which a mole fraction of Ni of single-particulate small particles (e.g., small particles in the form of single particle) was 0.85 were prepared as follows.

Synthesizing of Positive Electrode Active Materials Having Large Particles

After preparing nickel sulfate, cobalt sulfate, and manganese sulfate, a coprecipitation reaction was performed to synthesize a precursor, LiOH was then added to the synthesized precursor, followed by firing, and thus a lithium complex oxide was prepared. Specifically, after mixing LiOH with the precursor, a temperature was raised by 1° C. per minute to perform heat treatment for 10 hours while an $O_2$ atmosphere was maintained in a firing furnace, and then the heat-treated mixture was naturally cooled, and thus a positive electrode active material was prepared.

Subsequently, after a distilled water was added to the lithium complex oxide, the lithium complex oxide was washed with the distilled water for 1 hour, the washed lithium complex oxide was then filtered and dried, and thus a positive electrode active material having large particles having an average diameter in a range of 11 to 13 μm was obtained.

Method of Synthesizing Positive Electrode Active Material Having Single-Particulate Small Particles After preparing nickel sulfate, cobalt sulfate, and manganese sulfate, a coprecipitation reaction was performed to synthesize a precursor, LiOH was then added to the synthesized precursor, followed by firing, and thus a lithium complex oxide was prepared. Specifically, after mixing LiOH with the precursor, a temperature was raised to 900° C. by 1° C. per minute to perform heat treatment for 10 hours while an $O_2$ atmosphere was maintained in a firing furnace, and then the heat-treated mixture was naturally cooled, and thus a positive electrode active material was prepared.

Subsequently, after the lithium complex oxide was pulverized to a size of 3 to 4 μm using a pulverizer, a distilled water was added to wash the lithium complex oxide for 1 hour, the washed lithium complex oxide was then filtered and dried, and thus a positive electrode active material having single-particulate small particles was obtained.

Preparing of Final Bimodal Positive Electrode Active Material by Mixing the Large Particles and the Small Particles Subsequently, the positive electrode active material having large particles and the positive electrode active material having single-particulate small particles were mixed with a boron (B)-containing raw material ($H_3BO_3$) using a mixer to perform B coating. The B-containing raw material ($H_3BO_3$) was mixed in an amount of 0.2% by weight (wt %) with respect to the total weight of the lithium complex oxide. While maintaining an $O_2$ atmosphere in the same firing furnace, a temperature was raised by 2° C. per minute to perform heat treatment for 5 hours, and then the heat-treated mixture was naturally cooled, and thus a lithium complex oxide was obtained.

Figure 1:
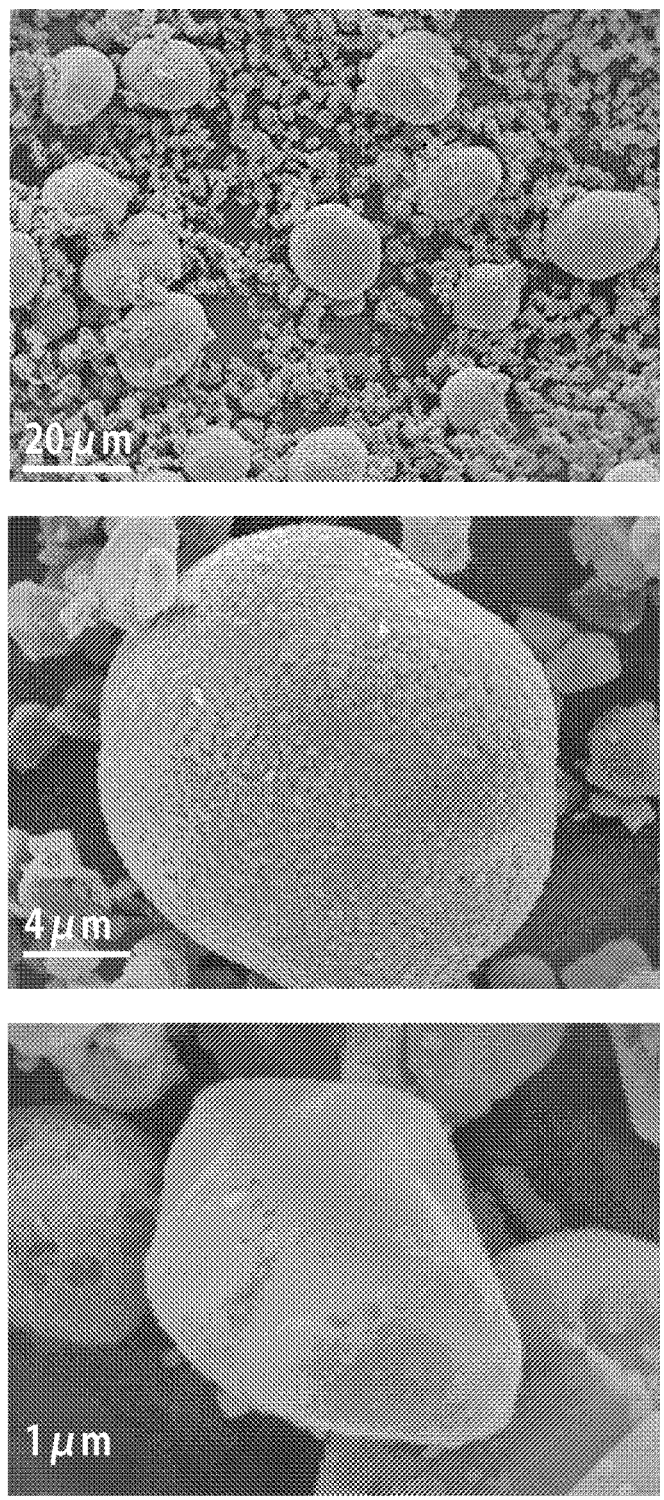
FIG. 1 is an SEM image illustrating a lithium complex oxide according to an embodiment of the present disclosure.

A SEM photograph of the prepared lithium complex oxide was measured and shown in FIG. 1.

<Preparation Example> Preparation of Battery

A slurry was prepared by mixing the positive electrode active material for a lithium secondary battery prepared according to Preparation Example 1, artificial graphite as a conductive material, and polyvinylidene fluoride (PVdF) as a binder in a weight ratio of 85:10:5. The slurry was uniformly applied to an aluminum foil having a thickness of 15 μm and vacuum dried at 135° C., and thus a positive electrode for a lithium secondary battery was prepared.

A coin battery was manufactured in a conventional method using the positive electrode, a lithium foil as a counter electrode, a porous polypropylene film having a thickness of 20 μm as a separator, and an electrolytic solution in which $LiPF_6$ was dissolved at a concentration of 1.15 M in a solvent in which ethylene carbonate, diethyl carbonate, and ethyl methyl carbonate were mixed in a volume ratio of 3:1:6.

Experimental Example 1

Figure 6:
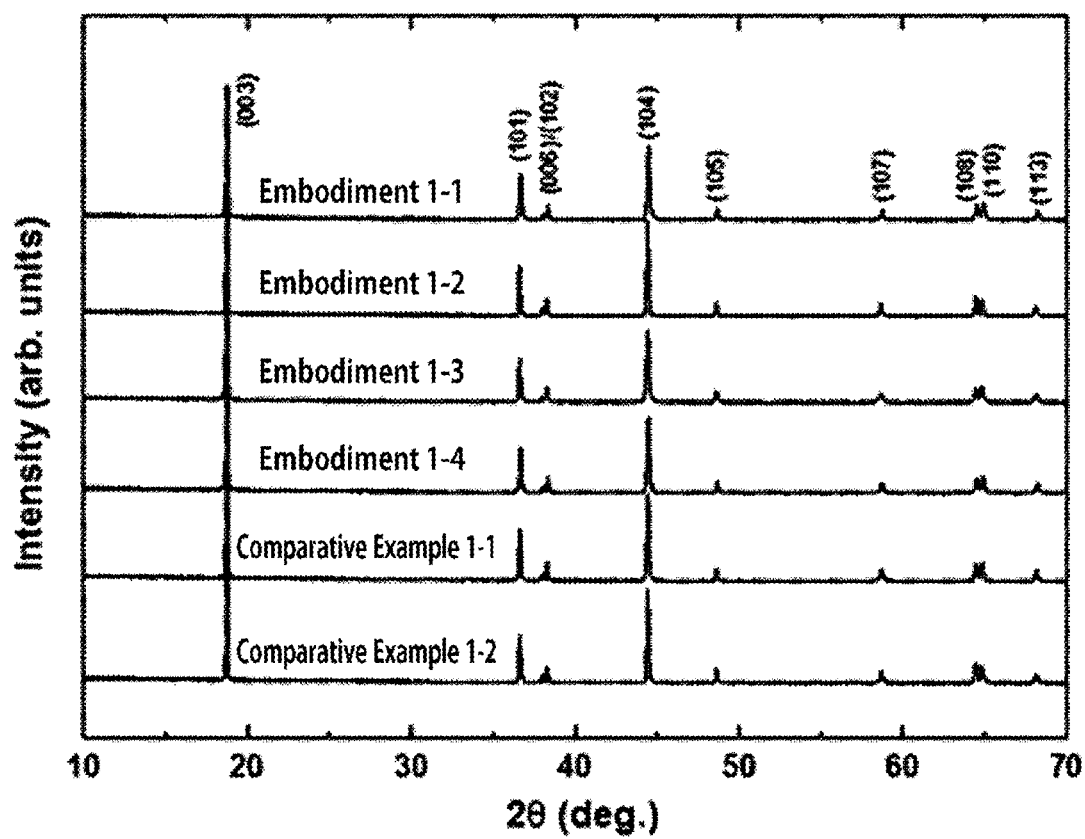
FIG. 6 illustrates results of XRD analysis of lithium complex oxides according to Embodiments of the present disclosure and Comparative Examples.

Results of XRD analysis of Embodiments 1-1 to 1-4 and Comparative Examples 1-1 and 1-2 prepared by the preparing method of Preparation Example 1 are illustrated in FIG. 6. It was appreciated that all samples had a hexagonal α-$NaFeO_2$ (R-3m space group) structure.

Figure 7:
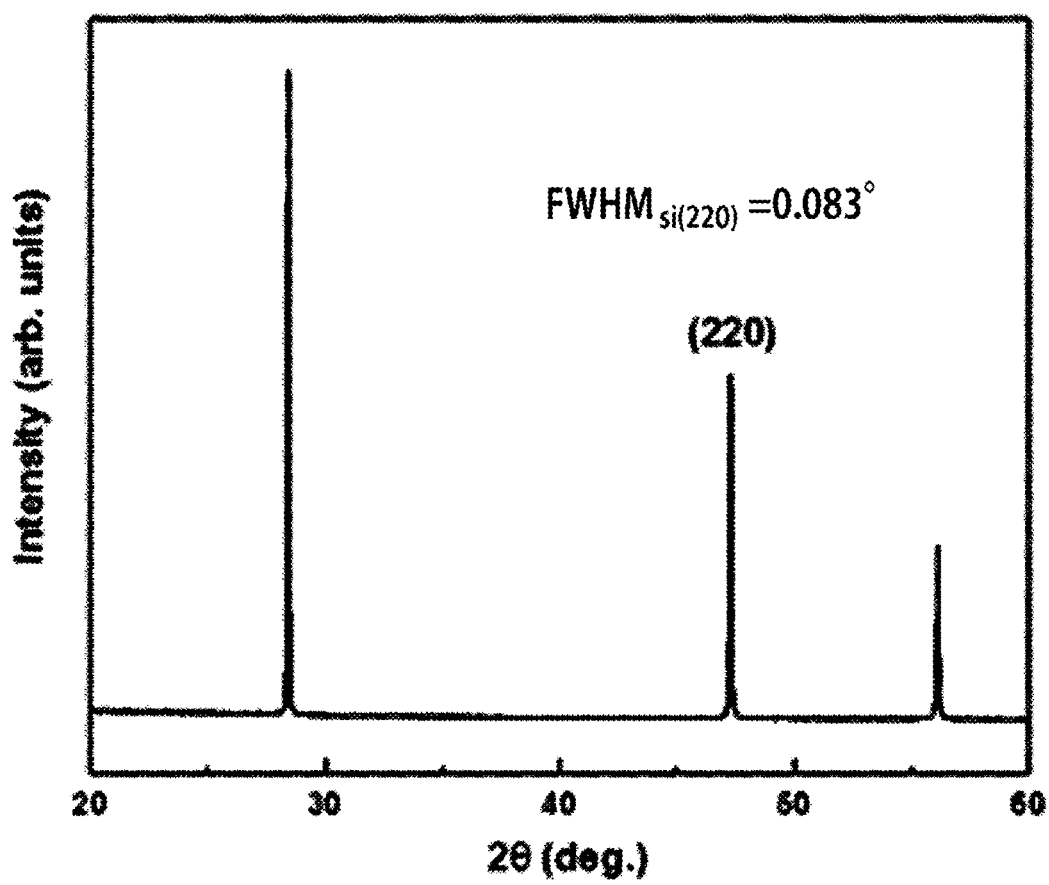
FIG. 7 illustrates results of XRD analysis of a Si powder according to an embodiment of the present disclosure.

In addition, results of a Si powder analysis with the same XRD equipment and conditions for FWHM correction are illustrated in FIG. 7.

Next, respective $FWHM_{(104)}$ values were measured, which are shown in Tables 1 and 2.

TABLE 1

| | Multi-particulate large particles | | | | | |
|---|---|---|---|---|---|---|
| | Heat-treatment temp. (° C.) | Li/Metal (molar ratio) | Molar ratio | | | FWHM Large particle (104) |
| | | | Ni/(Ni + Co + Mn) | Co/(Ni + Co + Mn) | Mn/(Ni + Co + Mn) | |
| Embodiment 1-1 | 790 | 1.00 | 0.80 | 0.10 | 0.10 | 0.1579 |
| Embodiment 1-2 | 780 | 1.02 | 0.80 | 0.10 | 0.10 | 0.1644 |
| Embodiment 1-3 | 780 | 1.01 | 0.80 | 0.09 | 0.11 | 0.1779 |
| Embodiment 1-4 | 770 | 1.03 | 0.80 | 0.10 | 0.10 | 0.1869 |
| Comp. Example 1-1 | 800 | 1.02 | 0.80 | 0.09 | 0.11 | 0.1385 |
| Comp. Example 1-2 | 760 | 1.01 | 0.80 | 0.10 | 0.10 | 0.2013 |

TABLE 2

| | Single-particulate small particles | | | | | |
|---|---|---|---|---|---|---|
| | Heat-treatment temp. (° C.) | Li/Metal (molar ratio) | Molar ratio | | | FWHM Small particle (104) |
| | | | Ni/(Ni + Co + Mn) | Co/(Ni + Co + Mn) | Mn/(Ni + Co + Mn) | |
| Embodiment 1-1 | 900 | 1.06 | 0.85 | 0.11 | 0.04 | 0.1044 |
| Embodiment 1-2 | 900 | 1.06 | 0.85 | 0.11 | 0.04 | 0.1044 |
| Embodiment 1-3 | 900 | 1.06 | 0.85 | 0.11 | 0.04 | 0.1044 |
| Embodiment 1-4 | 900 | 1.06 | 0.85 | 0.11 | 0.04 | 0.1044 |
| Comp. Example 1-1 | 900 | 1.06 | 0.85 | 0.11 | 0.04 | 0.1044 |
| Comp. Example 1-2 | 900 | 1.06 | 0.85 | 0.11 | 0.04 | 0.1044 |

After a positive electrode active material in which a mole fraction of Ni of large particles was 0.80 and a mole fraction of Ni of small particles, which are single particles, was 0.85 were prepared as in the preparing method of Preparation Example 1, a mass ratio of large particles, a mass ratio of small particles, and $FWHM_{Mixture(104)}$ according to a mole fraction of Ni were measured to calculate a FWHM range value in accordance with a relational formula of the present disclosure. Next, a battery according to the above Preparation Example was manufactured, and then a discharge capacity and life characteristics were measured, which are shown in Table 3 below and FIGS. 8 and 9.

TABLE 3

| | Mixture of multi-particulate large particles + single-particulate small particles | | | | | | | |
|---|---|---|---|---|---|---|---|---|
| | Mass ratio of large particles | Mass ratio of small particles | Ni/(Ni + Co + Mn) | B (ppm) | FWHM Mixture (104) | FWHM range value | Discharge capacity (mAh/g) | Life @50cyc (%) |
| Embodiment 1-1 | 0.6 | 0.4 | 0.82 | 311 | 0.1341 | −0.016 | 204.9 | 95.5 |
| Embodiment 1-2 | 0.7 | 0.3 | 0.82 | 317 | 0.1455 | −0.008 | 205.6 | 95.9 |
| Embodiment 1-3 | 0.8 | 0.2 | 0.81 | 299 | 0.1644 | 0.007 | 206.8 | 96.2 |
| Embodiment 1-4 | 0.9 | 0.1 | 0.81 | 305 | 0.1801 | 0.016 | 207.9 | 96.6 |
| Comp. Example 1-1 | 0.7 | 0.3 | 0.82 | 309 | 0.1296 | −0.031 | 205.6 | 91.9 |
| Comp. Example 1-2 | 0.7 | 0.3 | 0.82 | 301 | 0.1708 | 0.028 | 199.8 | 92.8 |

Figure 8:
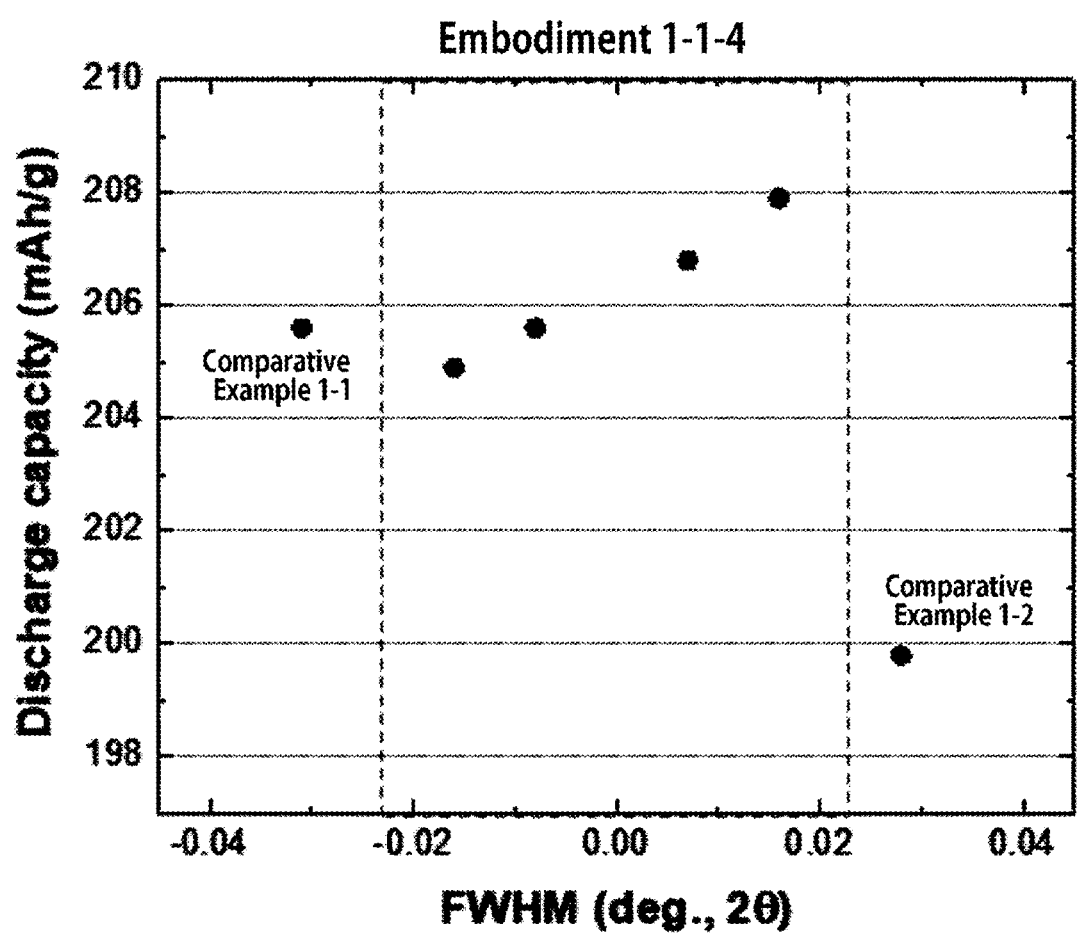
FIGS. 8 and 9 illustrate graphs comparing battery characteristics of lithium complex oxides according to Embodiments of the present disclosure and Comparative Examples.
Figure 9:
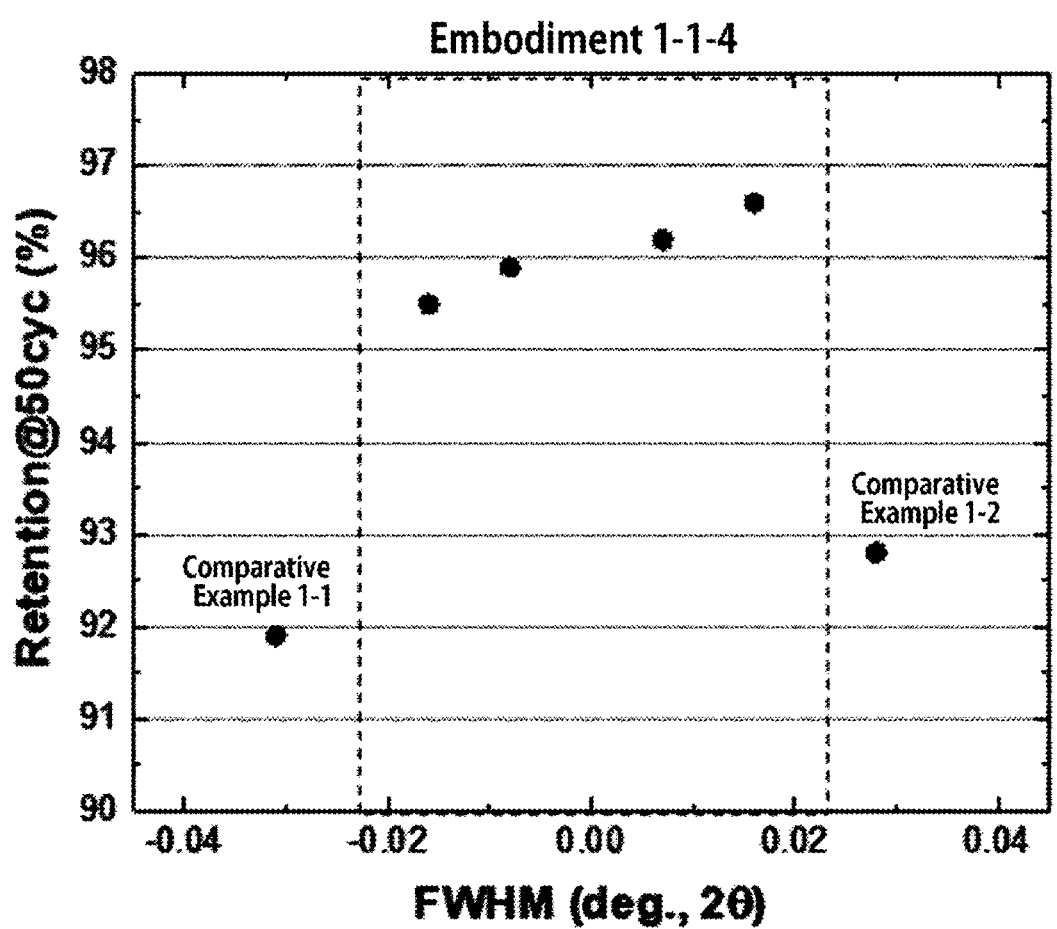

Referring to Table 3 and FIGS. 8 and 9, in the case of Embodiments 1-1 to 1-4 in which the FWHM range value satisfies the FWHM optimum range, the discharge capacity and life characteristics of the battery were excellent. However, in the case of Comparative Examples 1-1 to 1-2 in which the FWHM range value does not satisfy the FWHM optimum range, it was appreciated that the discharge capacity and life characteristics of the battery were poor.

Preparation Example 2

A positive electrode active material in which a mole fraction of Ni of multi-particulate large particles was 0.88 and a positive electrode active material in which a mole fraction of Ni of single-particulate small particles was 0.88 were prepared Synthesizing of Positive Electrode Active Materials Having Large Particles After preparing nickel sulfate, cobalt sulfate, and manganese sulfate, a coprecipitation reaction was performed to synthesize a precursor, LiOH was then added to the synthesized precursor, followed by firing, and thus a lithium complex oxide was prepared. Specifically, after mixing LiOH with the precursor, a temperature was raised by 1° C. per minute to perform heat treatment for 10 hours while an $O_2$ atmosphere was maintained in a firing furnace, and then the heat-treated mixture was naturally cooled, and thus a positive electrode active material having large particles having an average diameter in a range of 11 to 13 µm was obtained.

Method of Synthesizing Positive Electrode Active Material Having Single-Particulate Small Particles After preparing nickel sulfate, cobalt sulfate, and manganese sulfate, a coprecipitation reaction was performed to synthesize a precursor, LiOH was then added to the synthesized precursor, followed by firing, and thus a lithium complex oxide was prepared. Specifically, after mixing LiOH with the precursor, a temperature was raised to 900° C. by 1° C. per minute to perform heat treatment for 10 hours while an $O_2$ atmosphere was maintained in a firing furnace, and then the heat-treated mixture was naturally cooled, and thus a positive electrode active material was prepared.

Subsequently, the lithium complex oxide was pulverized to a size of 3 to 4 µm using a pulverizer, and thus a positive electrode active material having single-particulate small particles was obtained.

Preparing of Final Bimodal Positive Electrode Active Material by Mixing the Large Particles and the Small Particles Subsequently, the positive electrode active material having the multi-particulate large particles and the positive electrode active material having single-particulate small particles were mixed with $Al_2O_3$ and $ZrO_2$ using a mixer to perform Al and Zr coating. While maintaining an $O_2$ atmosphere in the same firing furnace, a temperature was raised by 2° C. per minute to perform heat treatment for 5 hours, and then the heat-treated mixture was naturally cooled.

Subsequently, a distilled water was added to wash the lithium complex oxide for 1 hour, and the washed lithium complex oxide was then filtered and dried, and thus a lithium complex oxide was obtained.

Experimental Example 2

According to results of XRD analysis of Embodiments 2-1 to 2-4 and Comparative Examples 2-1 and 2-2 prepared by the preparing method of Preparation Example 2, it was appreciated that all samples had a hexagonal α-NaFeO$_2$ (R-3m space group) structure.

Next, respective $FWHM_{(104)}$ values were measured, which are shown in Tables 4 and 5.

TABLE 4

| | Multi-particulate large particle | | | | | |
|---|---|---|---|---|---|---|
| | Heat-treatment temp. (° C.) | Li/Metal (molar ratio) | Molar ratio | | | FWHM Large particle (104) |
| | | | Ni/(Ni + Co + Mn) | Co/(Ni + Co + Mn) | Mn/(Ni + Co + Mn) | |
| Embodiment 2-1 | 740 | 1.01 | 0.88 | 0.09 | 0.03 | 0.1738 |

TABLE 4-continued

| | Multi-particulate large particle | | | | | |
|---|---|---|---|---|---|---|
| | Heat-treatment temp. (° C.) | Li/Metal (molar ratio) | Molar ratio | | | FWHM Large particle (104) |
| | | | Ni/(Ni + Co + Mn) | Co/(Ni + Co + Mn) | Mn/(Ni + Co + Mn) | |
| Embodiment 2-2 | 730 | 1.02 | 0.88 | 0.09 | 0.03 | 0.1816 |
| Embodiment 2-3 | 720 | 1.02 | 0.88 | 0.08 | 0.04 | 0.1943 |
| Embodiment 2-4 | 710 | 1.04 | 0.88 | 0.09 | 0.03 | 0.2043 |
| Comp. Example 2-1 | 750 | 1.01 | 0.88 | 0.08 | 0.04 | 0.1565 |
| Comp. Example 2-2 | 700 | 1.04 | 0.88 | 0.09 | 0.03 | 0.2227 |

TABLE 5

| | Single-particulate small particles | | | | | |
|---|---|---|---|---|---|---|
| | Heat-treatment temp. (° C.) | Li/Metal (molar ratio) | Molar ratio | | | FWHM Small particle (104) |
| | | | Ni/(Ni + Co + Mn) | Co/(Ni + Co + Mn) | Mn/(Ni + Co + Mn) | |
| Embodiment 2-1 | 900 | 1.04 | 0.88 | 0.10 | 0.02 | 0.1029 |
| Embodiment 2-2 | 900 | 1.04 | 0.88 | 0.10 | 0.02 | 0.1029 |
| Embodiment 2-3 | 900 | 1.04 | 0.88 | 0.10 | 0.02 | 0.1029 |
| Embodiment 2-4 | 900 | 1.04 | 0.88 | 0.10 | 0.02 | 0.1029 |
| Comp. Example 2-1 | 900 | 1.04 | 0.88 | 0.10 | 0.02 | 0.1029 |
| Comp. Example 2-2 | 900 | 1.04 | 0.88 | 0.10 | 0.02 | 0.1029 |

After a positive electrode active material in which a mole fraction of Ni of large particles was 0.88 and a mole fraction of Ni of small particles, which are single particles, was 0.88 were prepared as in the preparing method of Preparation Example 2, a mass ratio of large particles, a mass ratio of small particles, and FWHM$_{Mixture(104)}$ according to a mole fraction of Ni were measured to calculate a FWHM range value in accordance with a relational formula of the present disclosure. Next, a battery according to the above Preparation Example was manufactured, and then a discharge capacity and life characteristics were measured, which are shown in Table 6 below and FIGS. 10 and 11.

TABLE 6

| | Mixture of multi-particulate large particles + single-particulate small particles | | | | | | | | |
|---|---|---|---|---|---|---|---|---|---|
| | Mass ratio of large particles | Mass ratio of small particles | Ni/(Ni + Co + Mn) | Al (ppm) | Zr (ppm) | FWHM Mixture (104) | FWHM Range value | Discharge capacity (mAh/g) | Life @50cyc (%) |
| Embodiment 2-1 | 0.6 | 0.4 | 0.88 | 1605 | 1014 | 0.1472 | −0.014 | 210.7 | 94.7 |
| Embodiment 2-2 | 0.7 | 0.3 | 0.88 | 1592 | 1101 | 0.1619 | −0.005 | 213.4 | 95.5 |
| Embodiment 2-3 | 0.8 | 0.2 | 0.88 | 1618 | 998 | 0.1798 | 0.007 | 215.2 | 95.3 |
| Embodiment 2-4 | 0.9 | 0.1 | 0.88 | 1585 | 1016 | 0.1959 | 0.014 | 217.6 | 94.9 |
| Comp. Example 2-1 | 0.7 | 0.3 | 0.88 | 1677 | 1051 | 0.1401 | −0.036 | 212.4 | 91.1 |
| Comp. Example 2-2 | 0.7 | 0.3 | 0.88 | 1628 | 1121 | 0.1874 | 0.032 | 209.7 | 90.8 |

Figure 10:
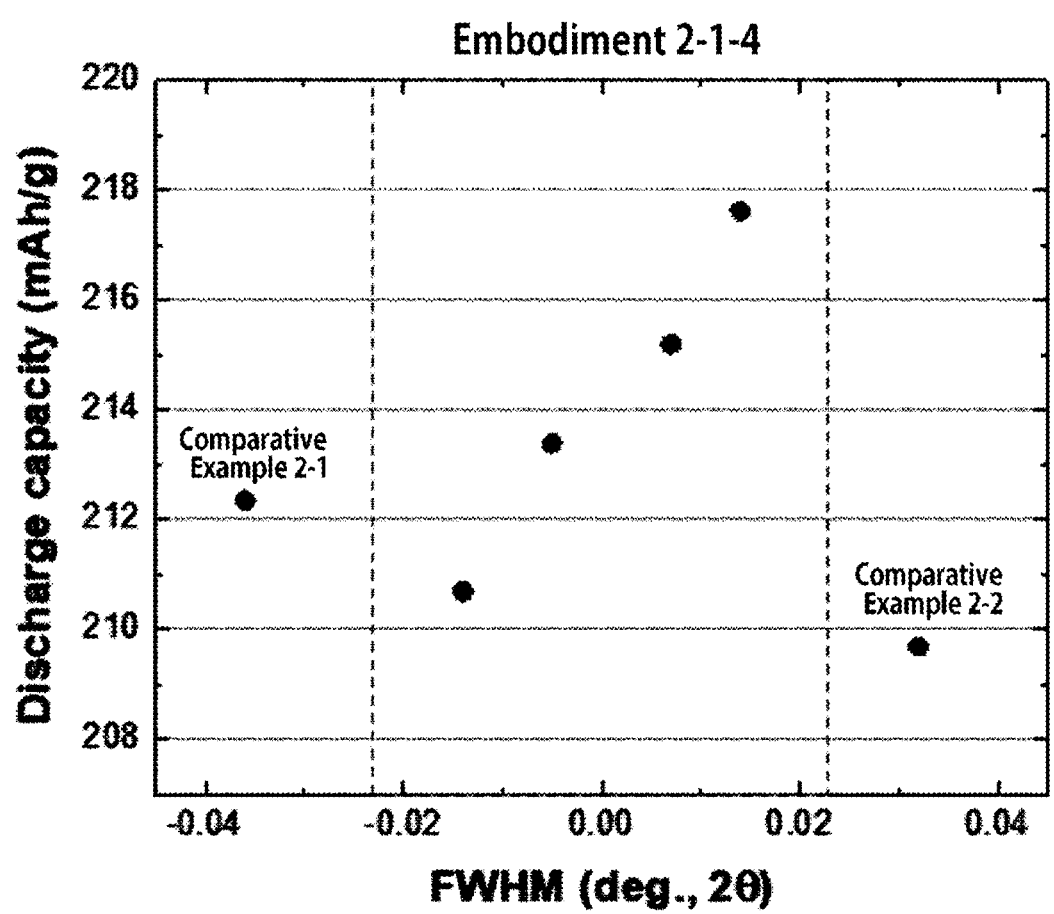
FIGS. 10 and 11 illustrate graphs comparing battery characteristics of lithium complex oxides according to Embodiments of the present disclosure and Comparative Examples.
Figure 11:
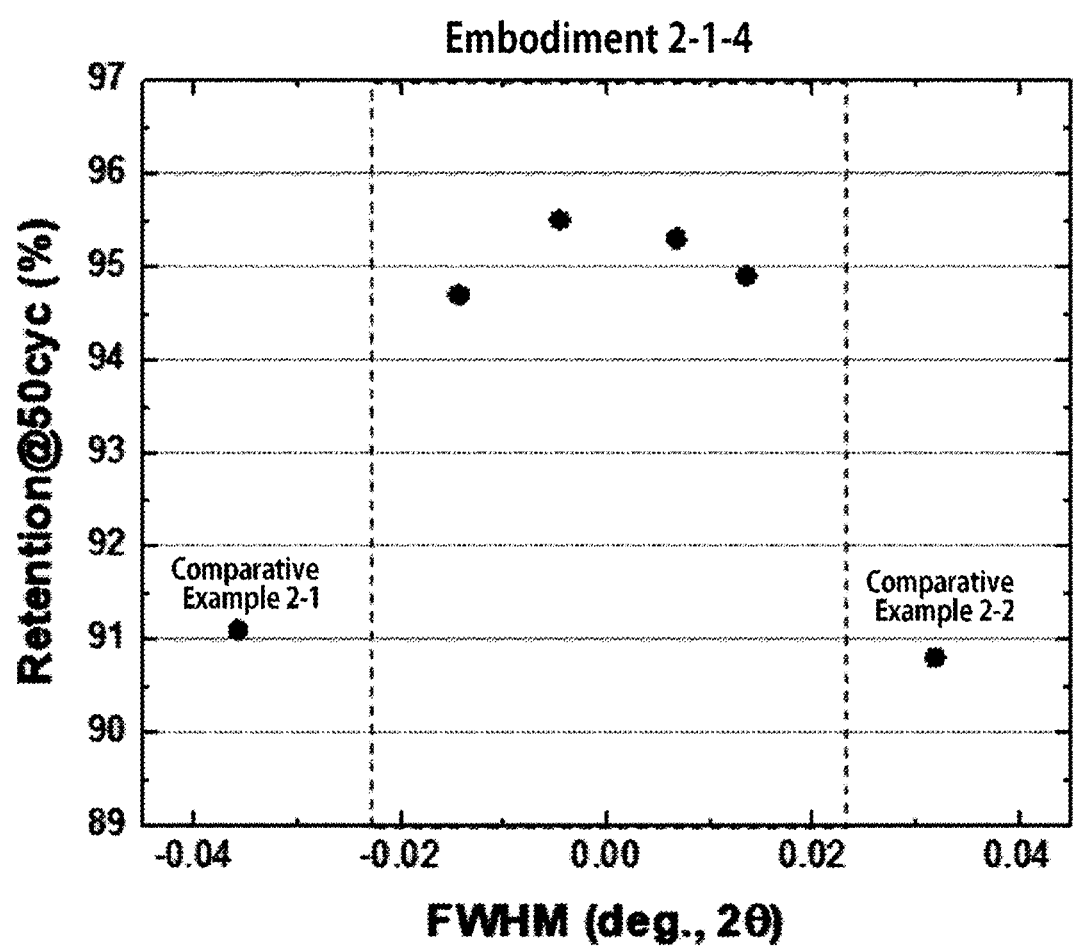

Referring to Table 6 and FIGS. 10 and 11, in the case of Embodiments 2-1 to 2-4 in which the FWHM range value satisfies the FWHM optimum range, the discharge capacity and life characteristics of the battery were excellent. However, in the case of Comparative Examples 2-1 and 2-2 in which the FWHM range value does not satisfy the FWHM optimum range, it was appreciated that the discharge capacity and life characteristics of the battery were poor.

Preparation Example 3

A lithium complex oxide was prepared in the same manner as in Preparation Example 2, except that a mole fraction of Ni of multi-particulate large particles was 0.94, a mole fraction of Ni of single-particulate small particles was 0.92 and Ti and Zr coating was performed.

Experimental Example 3

According to results of XRD analysis of Embodiments 3-1 to 3-4 and Comparative Examples 3-1 and 3-2 prepared by the preparing method of Preparation Example 3, it was appreciated that all samples had a hexagonal α-NaFeO$_2$ (R-3m space group) structure.

Next, respective FWHM$_{(104)}$ values were measured, which are shown in Tables 7 and 8.

TABLE 7

| | Multi-particulate large particles | | | | | |
|---|---|---|---|---|---|---|
| | Heat-treatment temp. (° C.) | Li/Metal (molar ratio) | Ni/(Ni + Co + Mn) | Co/(Ni + Co + Mn) | Mn/(Ni + Co + Mn) | FWHM Large particle (104) |
| | | | Molar ratio | | | |
| Embodiment 3-1 | 720 | 1.03 | 0.94 | 0.03 | 0.03 | 0.1891 |
| Embodiment 3-2 | 710 | 1.00 | 0.94 | 0.03 | 0.03 | 0.1930 |
| Embodiment 3-3 | 710 | 1.03 | 0.94 | 0.03 | 0.03 | 0.2088 |
| Embodiment 3-4 | 700 | 1.02 | 0.94 | 0.03 | 0.03 | 0.2217 |
| Comp. Example 3-1 | 730 | 1.01 | 0.94 | 0.03 | 0.03 | 0.1643 |
| Comp. Example 3-2 | 700 | 1.04 | 0.94 | 0.03 | 0.03 | 0.2459 |

TABLE 8

| | Single-particulate small particles | | | | | |
|---|---|---|---|---|---|---|
| | Heat-treatment temp. (° C.) | Li/Metal (molar ratio) | Ni/(Ni + Co + Mn) | Co/(Ni + Co + Mn) | Mn/(Ni + Co + Mn) | FWHM Small particle (104) |
| | | | Molar ratio | | | |
| Embodiment 3-1 | 900 | 1.05 | 0.92 | 0.06 | 0.02 | 0.1031 |
| Embodiment 3-2 | 900 | 1.05 | 0.92 | 0.06 | 0.02 | 0.1031 |
| Embodiment 3-3 | 900 | 1.05 | 0.92 | 0.06 | 0.02 | 0.1031 |
| Embodiment 3-4 | 900 | 1.05 | 0.92 | 0.06 | 0.02 | 0.1031 |
| Comp. Example 3-1 | 900 | 1.05 | 0.92 | 0.06 | 0.02 | 0.1031 |
| Comp. Example 3-2 | 900 | 1.05 | 0.92 | 0.06 | 0.02 | 0.1031 |

After a positive electrode active material in which a mole fraction of Ni of large particles was 0.94 and a mole fraction of Ni of small particles, which are single particles, was 0.92 were prepared as in the preparing method of Preparation Example 3, a mass ratio of large particles, a mass ratio of small particles, and FWHM$_{Mixture(104)}$ according to a mole fraction of Ni were measured to calculate a FWHM range value in accordance with a relational formula of the present disclosure. Next, a battery according to the above Preparation Example was manufactured, and then a discharge capacity and life characteristics were measured, which are shown in Table 9 below and FIGS. 12 and 13.

TABLE 9

| | Mixture of multi-particulate large particles + single-particulate small particles | | | | | | | | |
|---|---|---|---|---|---|---|---|---|---|
| | Mass ratio of large particles | Mass ratio of small particles | Ni/(Ni + Co + Mn) | Ti (ppm) | Zr (ppm) | FWHM Mixture (104) | FWHM range value | Discharge capacity (mAh/g) | Life @50cyc (%) |
| Embodiment 3-1 | 0.6 | 0.4 | 0.93 | 1225 | 1051 | 0.1544 | −0.017 | 218.4 | 93.6 |
| Embodiment 3-2 | 0.7 | 0.3 | 0.93 | 1210 | 1036 | 0.1680 | −0.011 | 220.5 | 93.5 |
| Embodiment 3-3 | 0.8 | 0.2 | 0.94 | 1248 | 1024 | 0.1892 | 0.004 | 223.0 | 94.1 |
| Embodiment 3-4 | 0.9 | 0.1 | 0.94 | 1236 | 1042 | 0.2151 | 0.020 | 224.8 | 94.6 |
| Comp. Example 3-1 | 0.7 | 0.3 | 0.93 | 1218 | 1061 | 0.1496 | −0.037 | 221.1 | 88.6 |
| Comp. Example 3-2 | 0.7 | 0.3 | 0.93 | 1261 | 1027 | 0.2038 | 0.040 | 219.4 | 87.8 |

Figure 12:
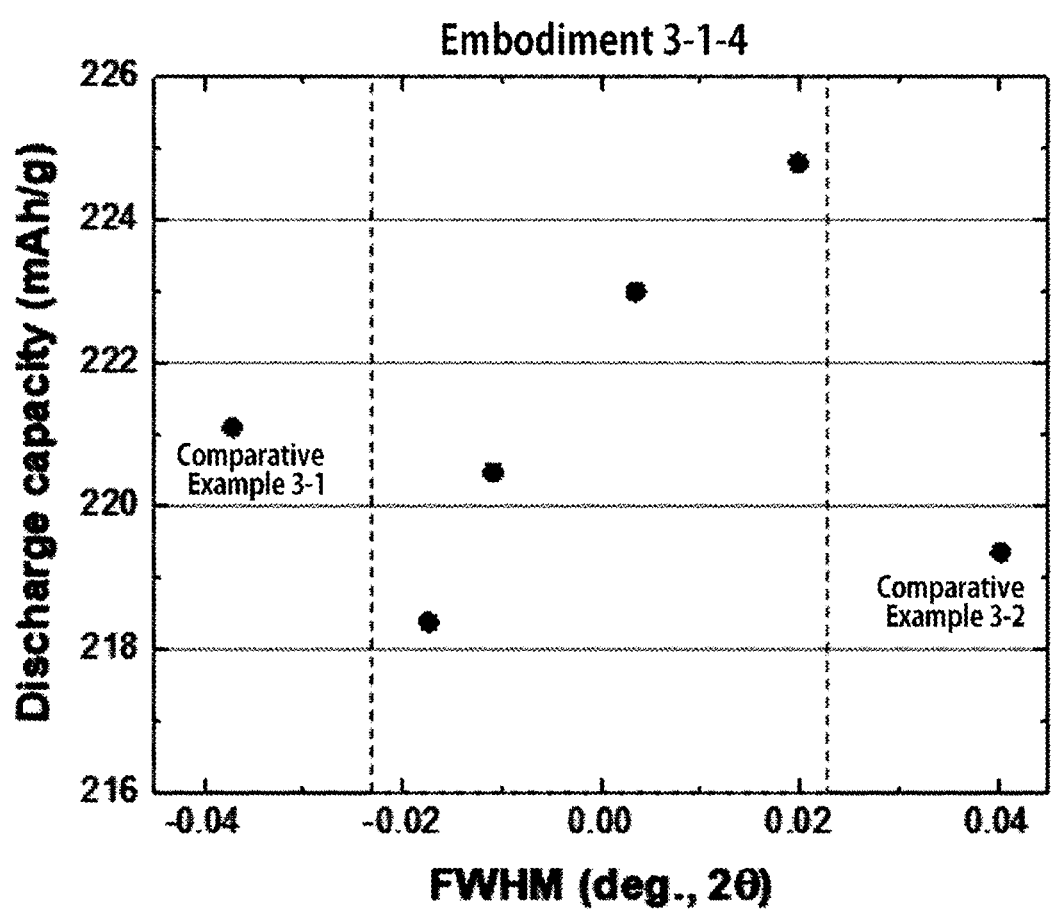
FIGS. 12 and 13 illustrate graphs comparing battery characteristics of lithium complex oxides according to Embodiments of the present disclosure and Comparative Examples.
Figure 13:
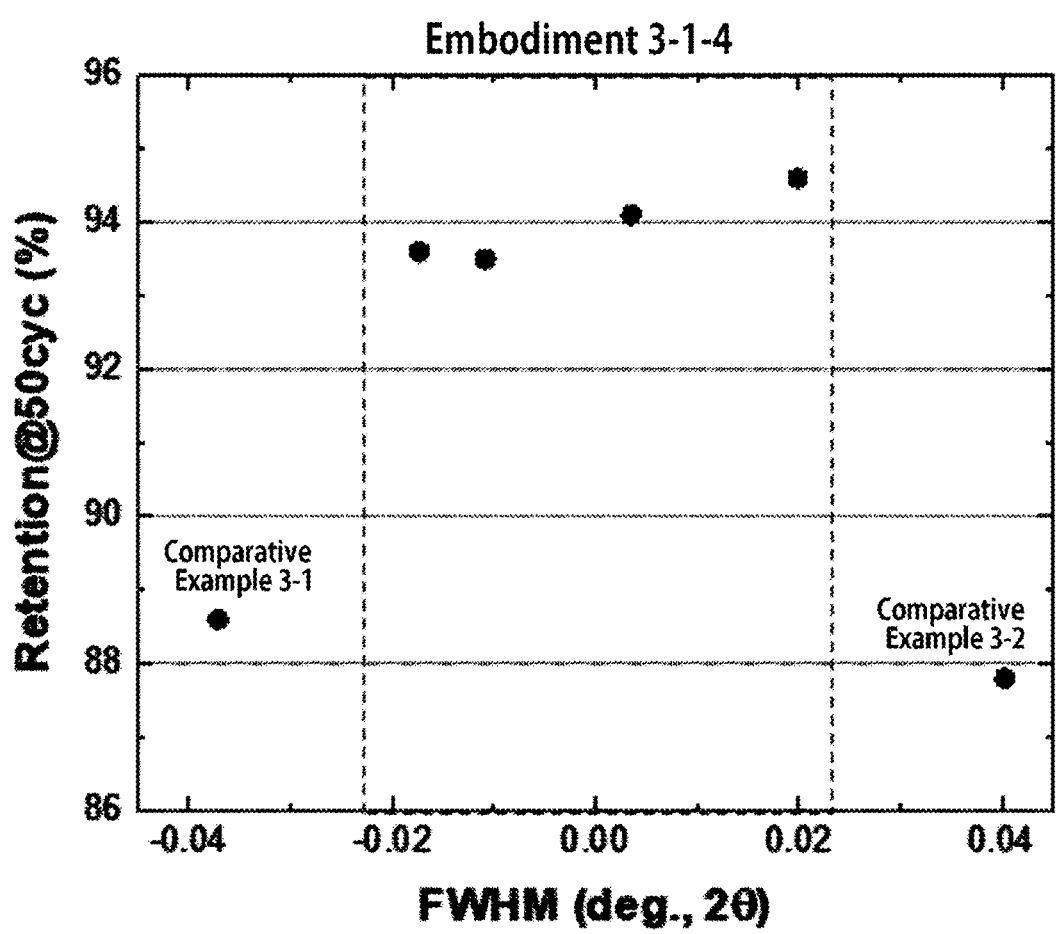

Referring to Table 9 and FIGS. 12 and 13, in the case of Embodiments 3-1 to 3-4 in which the FWHM range value satisfies the FWHM optimum range, the discharge capacity and life characteristics of the battery were excellent. However, in the case of Comparative Examples 3-1 and 3-2 in which the FWHM range value does not satisfy the FWHM optimum range, it was appreciated that the discharge capacity and life characteristics of the battery were poor.

<Experimental Example 4> Comparison of Multi-Particle-Mixed Bimodal and Single-Particle-Mixed Bimodal In the case of manufacturing a high-nickel NCM bimodal positive electrode active material by mixing small particles with large particles in the form of multi-particle, BET may be reduced, gas generation may be suppressed, and storage characteristics may be improved when small particles in the form of single particle are mixed, as compared to the case where small particles in the form of multi-particle are mixed.

Figure 4:
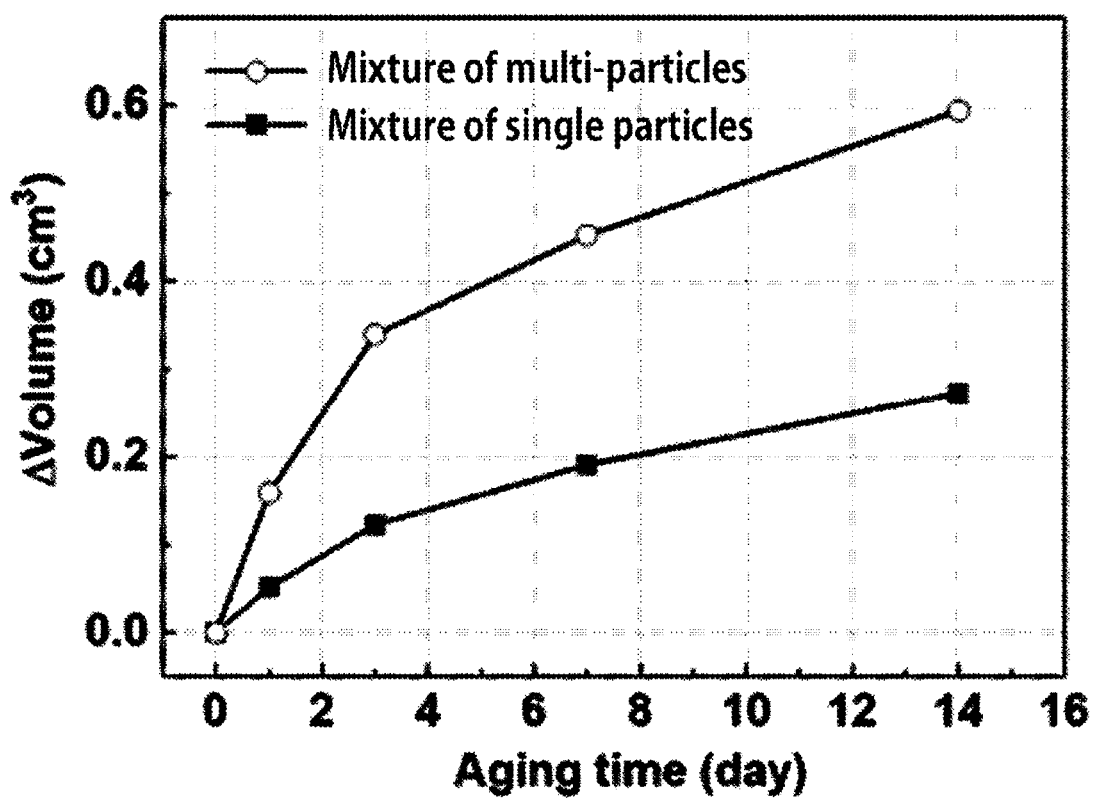
FIGS. 4 and 5 illustrate graphs comparing battery characteristics of a single-particle-mixed bimodal structure and a multi-particle-mixed bimodal structure.
Figure 5:
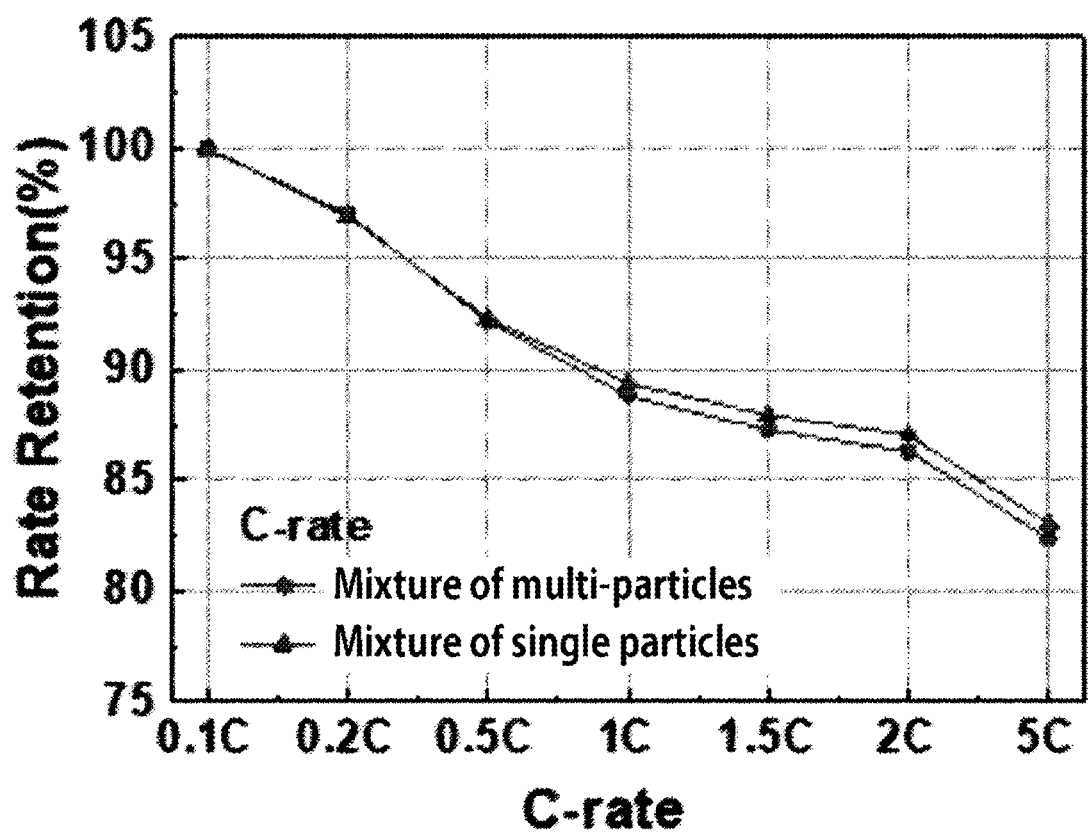

Rates of gas generation and lifetime characteristics when using the multi-particle-mixed bimodal and when using the single-particle-mixed bimodal were compared, which are shown in Table 10 and FIGS. 4 and 5.

Referring to FIG. 4, it may be appreciated that a volume change of a pouch cell due to gas generation when left at a high temperature in the case of the multi-particle-mixed bimodal was twice, or more than twice, as large as that in the case of the single-particle-mixed bimodal.

TABLE 10

| | Multi-particle-mixed bimodal | Single-particle-mixed bimodal |
|---|---|---|
| Conditions | Large particle:Multi-particulate small particles | Large particle:Single-particulate small particles |
| Rate | 8:2 | 8:2 |
| PD (g/cc) | 3.39 | 3.50 |
| BET (m²/g) | 1.89 | 1.46 |
| Coin CH | 235.6 | 237.2 |
| Cell DCH | 217.7 | 216.7 |
| Efficiency | 92.4% | 91.4% |
| EIS | 19.1 | 19.5 |
| Output (5 C/1 C) | 82.4% | 83.0% |
| 25° C. Life | 93.6% | 95.8% |

As set forth hereinabove, in the lithium complex oxide according to one or more embodiments of the present disclosure, micro-cracking of the first particles may be inhibited, and accordingly, the life characteristics of the battery including the Ni-rich positive electrode active material are improved by adjusting the range of the FWHM value of the 104 peak defined by a hexagonal lattice having an R-3m space group to maintain a predetermined relationship with the mole fraction of nickel and the mass ratio between the first particles and the second particles.

What is claimed is:

1. A lithium complex oxide comprising a mixture of first particles in which n1 (n1>40) number of primary particles are aggregated and second particles in which n2 (n2≤20) number of primary particles are aggregated, the lithium complex oxide represented by the following Chemical Formula 1 and having a full width at half maximum (FWHM) (deg., 2θ) of a 104 peak in an XRD peak, defined by a hexagonal lattice having an R-3m space group, in a range of the following Relational Formula 1:

$$Li_aNi_xCo_yMn_zM_{1-x-y-z}O_2,$$ [Chemical Formula 1]

wherein Chemical Formula 1, M is at least one selected from the group consisting of: B, Ba, Ce, Cr, F, Mg, Al, Cr, V, Ti, Fe, Zr, Zn, Si, Y, Nb, Ga, Sn, Mo, W, P, Sr, and a combination thereof, $0.9 \leq a \leq 1.3$, $0.6 \leq x \leq 1.0$, $0.0 \leq y \leq 0.4$, $0.0 \leq z \leq 0.4$, and $0.0 \leq 1-x-y-z \leq 0.4$, $$-0.025 \leq FWHM_{(104)} - \{0.04 + (x_{first\ particle} - 0.6) \times 0.25\} \leq 0.025,$$ [Relational Formula 1]

where $FWHM_{(104)}$ in Relational Formula 1 is represented by the following Relational Formula 2, $$FWHM_{(104)} = \{FWHM_{Chemical\ Formula\ 1\ powder(104)} - 0.1 \times mass\ ratio\ of\ second\ particles)/mass\ ratio\ of\ first\ particles\} - FWHM_{Si\ powder(220)},$$ [Relational Formula 2]

wherein Relational Formula 2, $FWHM_{Chemical\ Formula\ 1\ powder\ (104)}$ is a FWHM of a 104 peak observed near 44.5° (2θ) in an XRD measurement value of the lithium complex oxide, $FWHM_{Si\ powder\ (220)}$ is a FWHM of a 220 peak observed near 47.3° (2θ) in an XRD measurement value of a Si powder that is Sigma-Aldrich No. 215619 Si powder, $x_{first\ particle} = (x - x_{second\ particle} * mass\ ratio\ of\ second\ particles)/mass\ ratio\ of\ first\ particles$, $x_{second\ particle}$ meaning a Ni molar rate of the second particles, and x is as defined above in Chemical Formula 1, and the mass ratios mean a mass rate with respect to the total mass of the first particles and the second particles.

2. The lithium complex oxide of claim 1, wherein an average particle diameter of the first particles is in a range of 8 to 20 μm.

3. The lithium complex oxide of claim 1, wherein an average particle diameter of the second particles is in a range of 0.1 to 7 μm.

4. The lithium complex oxide of claim 1, wherein a crystal structure of the lithium complex oxide is a hexagonal α-NaFeO$_2$.

5. The lithium complex oxide of claim 1, wherein when a nickel content x is in a range of 0.97 to 0.99, the range of the FWHM$_{(104)}$ represented by the above Relational Formula 2 satisfies 0.108° (2θ) to 0.162° (2θ).

6. The lithium complex oxide of claim 1, wherein when a nickel content x is in a range of 0.93 to 0.95, the range of FWHM$_{(104)}$ represented by the above Relational Formula 2 satisfies 0.098° (2θ) to 0.152° (2θ).

7. The lithium complex oxide of claim 1, wherein when a nickel content x is in a range of 0.87 to 0.89, the range of the FWHM$_{(104)}$ represented by the above Relational Formula 2 satisfies 0.083° (2θ) to 0.137° (2θ).

8. The lithium complex oxide of claim 1, wherein when a nickel content x is in a range of 0.79 to 0.81, the range of the FWHM$_{(104)}$ represented by the above Relational Formula 2 satisfies 0.063° (2θ) to 0.117° (2θ).

9. A method for preparing the lithium complex oxide of claim 1, the method comprising:
preparing a first positive electrode active material by synthesizing a first positive electrode active material precursor including first particles in which n1 (n1>40) number of primary particles are aggregated and then firing the first positive electrode active material precursor after adding a lithium compound to the first positive electrode active material precursor;
synthesizing a second positive electrode active material precursor including second particles in which n2 (n2≤20) number of primary particles are aggregated and then firing the second positive electrode active material precursor after adding a lithium compound to the second positive electrode active material precursor;
preparing a second positive electrode active material by pulverizing a material formed in the synthesizing and the firing of the second positive electrode active material precursor;
mixing the first positive electrode active material and the second positive electrode active material; and
coating or doping the mixed material with a material M and then heat-treating the coated or doped material.

10. The method of claim 9, wherein in the adding of the lithium compound to the first positive electrode active material precursor and in the adding of the lithium compound to the second positive electrode active material precursor, the added lithium compound is LiOH.

11. The method of claim 9, wherein an average particle diameter of the first positive electrode active material prepared in the preparing of the first positive electrode active material is in a range of 8 to 20 μm.

12. The method of claim 9, wherein an average particle diameter of the second positive electrode active material prepared in the preparing of the second positive electrode active material is in a range of 0.1 to 7 μm.

13. The method of claim 9, further comprising washing, after firing of the first positive electrode active material precursor, after firing of the second positive electrode active material precursor, or after pulverizing of the material.

14. The method of claim 9, further comprising washing, after heat-treating of the coated or doped material.

15. The method of claim 9, wherein in the coating or doping of the mixed material with the material M, the material M is at least one selected from the group consisting of: B, Ba, Ce, Cr, F, Mg, Al, Cr, V, Ti, Fe, Zr, Zn, Si, Y, Nb, Ga, Sn, Mo, W, P, Sr, and any combination thereof.

* * * * *